2,921,915
PROCESS OF PREPARING POLYURETHANES USING TERTIARY AMINE SALTS AS ACCELERATORS

Franzkarl Brochhagen, Odenthal, Bezirk Koln, August Höchtlen, Bergisch-Neukirchen, and Erwin Weinbrenner, Leverkusen-Bayerwerk, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware No Drawing. Application August 17, 1954
Serial No. 450,514

Claims priority, application Germany August 19, 1953

5 Claims. (Cl. 260—2.5)

The present invention relates to foamed plastics and to a process for producing same.

It is known in the art that foamed plastics can be produced by reacting polyisocyanates with organic compounds containing reactive hydrogen atoms in the presence or absence of water and in the presence of activators. For example, such products may be prepared by reacting a polyisocyanate with a polyhydroxy and/or polycarboxy compound under the above conditions. The polyhydroxy and/or polycarboxy organic compounds used in this reaction are preferably polyesters containing hydroxyl and/or carboxyl end groups; they are prepared by reacting one or more polyhydroxy organic compounds with one or more polycarboxylic acids; and one of these reactants is employed in excess so that a polyester having unreacted hydroxyl or carboxyl groups is obtained. The activators usually comprise an alkaline reaction accelerator such as a tertiary amine, an alkali phenolate, etc. but preferably also include water or an emulsifier and water.

In the production of foamed plastics from aqueous systems in which reliance is placed upon the reaction of polyisocyanates with water to supply the carbon dioxide necessary for the foaming action, it has been found that the amount of polyisocyanate involved is twice that required for reaction with carboxyl groups to yield the same amount of carbon dioxide. However, the latter reaction proceeds at an extremely slow rate at room temperature under the usual conditions of activation and therefore its use in the manufacture of plastic foams is commercially unattractive.

In accordance with the present invention, it has been discovered that the reaction of polyisocyanates with carboxy compounds in the absence or substantial absence of water can be converted into a practical and substantially quantitative one if it is effected in the presence of an acid or neutral tertiary amine salt of the type hereinafter described. In addition, it has been found that the reaction of polyisocyanates with hydroxy organic compounds in an aqueous medium is greatly accelerated if executed in the presence of these salts.

The salts used in the practice of this invention are compounds selected from the group consisting of neutral and acid tertiary amine salts of polycarboxylic acids and particularly polycarboxylic acids selected from the group consisting of aliphatic and aromatic polycarboxylic acids. The tertiary amines which are particularly suitable for making these salts are aliphatic amines such as N-dialkyl ethanolamines like N-diethyl ethanolamine, N-dipropyl ethanolamine, etc.; ester amines such as the esterification product of adipic acid and N-dimethyl ethanolamine, the diacetate of N-methyl diethanolamine, etc.; reaction products of N-dialkyl alkanolamines with aryl isocyanates such as the reaction product of N-diethyl ethanolamine with phenyl isocyanate, etc.; hydroaromatic amines such as hexahydro-dimethylaniline, etc.; and aromatic amines such as dimethylaniline, etc.

In carrying out the above reactions, the polyisocyanate reacts with the acid or neutral tertiary amine salt to liberate carbon dioxide and the tertiary amine which catalyzes the reaction of the polyisocyanate with the compound containing reactive hydrogen atoms, for example the hydroxy polyester and/or carboxy polyester to form a polyurethane and/or polyamide. In this manner, foamed plastics having selected physical properties and densities can be produced using a substantially smaller amount of polyisocyanate than is required in foaming systems which do not include these salts.

Where the polyester chiefly contains carboxyl groups, these groups may be wholly or partially neutralized by the tertiary amines or the above mentioned tertiary amine salts may be added separately to the polyester prior to carrying out the foaming process. During the foaming process, the evolution of carbon dioxide is so accelerated by the presence of these salts that a foamed plastic having a density of from 50 to 200 kg./m.$^3$ is obtained.

The use of these tertiary amine salts is particularly valuable when producing foamed plastics by the reaction of polyesters containing reactive hydrogen atoms with compounds which act only as isocyanates at relatively high temperatures.

Broadly stated, the present invention is directed to a process for making foamed plastics, which comprises reacting a polyisocyanate with a compound containing reactive hydrogen atoms in the presence of a compound selected from the group consisting of neutral and acid tertiary amine salts of polycarboxylic acids and particularly polycarboxylic acids selected from the group consisting of aliphatic and aromatic polycarboxylic acids, the second mentioned reactant being capable of reacting with a polyisocyanate to yield a foam.

Expressed in a more limited form, the present invention is directed to a similar process for making foamed plastics, in which the compound containing reactive hydrogen atoms is a polyester containing unreacted hydroxyl and/or carboxyl groups; and the polycarboxylic acid used in making the tertiary amine salt is a dicarboxylic acid.

The invention is illustrated further by the following examples without being restricted thereto.

Example 1

A polyester derived from adipic acid, phthalic acid and hexanetriol or trimethylol propane having an acid number of 37 and an —OH content of 8–9% is reacted with an equivalent amount of tolylene diisocyanate in the presence of 10% (calculated on the polyester) of a salt of 1 mol of adipic acid and 1 mol of hexahydro-dimethylaniline. A hard foamed product having a uniform pore structure and a density between 50 and 60 kg./m.$^3$ is produced.

Example 2

3% to 5% of the salt obtained by reacting 3 mols of oxalic acid with 2 mols of the ester amine of 1 mol of adipic acid and 2 mols of N-diethyl ethanolamine is added to a solid linear polyester derived from 2 mols of adipic acid, 1.7 mols of ethylene glycol and 0.5 mol of diethylene glycol, and lengthened by reaction with 0.2 mol of tolylene diisocyanate. The product thus obtained is mixed with the addition product of 1 mol of trimethylol propane to 3 mols of tolylene diisocyanate, in which the free isocyanate groups are reacted with phenol and the resulting mixture is heated. On heating the salt decomposes into the ester amine and oxalic acid and the latter reacts with the polyisocyanate to liberate carbon diioxide and thereby produce a foam.

Example 3

A polyester derived from 3 mols of adipic acid, 1 mol of hexanetriol or 1 mol of trimethylol propane and 3 mols of 1,3-butylene glycol is mixed with 5–10% of a salt prepared from molar amounts of adipic acid and the ester amine of 1 mol of adipic acid and 2 mols of dimethyl ethanolamine. After reacting the mixture with the necessary quantity of tolylene diisocyanate (an amount 50% in excess of that calculated on the terminal hydroxyl groups of the polyester), a rigid foam having a density between 100 and 40 kg./m.$^3$ is produced.

Illustrative examples of polyhydroxy compounds which may be used in the practice of this invention are polyesters containing hydroxyl groups, ethylene glycol, diethylene glycol, triethylene glycol, pentamethylene glycol, hexamethylene glycol, decamethylene glycol, dodecamethylene glycol, propylene glycol, 1,2-propylene glycol, 1,3-propylene glycol, butanediol-1,2, butanediol-2,3, butanediol-1,3, butanediol-1,4, isobutylene glycol, pinacol, hexanediol-1,4, pentanediol-1,5, 2-methyl-2-4-pentanediol, heptanediol-1,7, heptanediol-1,4, thiodiglycol, n-butyldiethanolamine, N,N-diethanolaniline, hydroquinonediglycol ether, transhexahydroxylylene glycol, m-dihydroxybenzene, o-dihydroxybenzene, glycerol, 1,1,1-trimethylol propane, trihydroxybenzene, castor oil, erythritol, pentaerythritol, triethanolamine and mannitol, etc.

As examples of polycarboxy compounds which may be employed in the practice of this invention there may be mentioned polyesters containing free carboxyl groups, adipic, β-methyl adipic, azelaic, fumaric, glutaric, 2-phenylglutaric, malic, maleic, malonic, methyl malonic, sebacic, suberic, succinic, pimelic, 4-ketopimelic, itaconic, dehydromuconic, decane - 1,10 - dicarboxylic, undecanedioic, ketoundecanedioic, brassylic, acetylenedicarboxylic, acetone dicarboxylic, diphenic, p - phenylenediacetic, phthalic, isophthalic, terephthalic, hexahydroterephthalic, cyclopentane-1,2-dicarboxylic, cyclopentane - 1,3 - dicarboxylic, cyclohexane-1,2-dicarboxylic, cyclohexane-1,3-dicarboxylic, cyclohexane-1,4-dicarboxylic, naphthalene-1,2-dicarboxylic, naphthalene-1,3-dicarboxylic, naphthalene - 1,4 - dicarboxylic, naphthalene-1,5-dicarboxylic, diphenylene-2,2-dicarboxylic, diphenylene-4,4'-dicarboxylic, diphenylene-2,4'-dicarboxylic, xylylene-1,4-dicarboxylic, xylylene-1,3-dicarboxylic, xylylene-1,2-dicarboxylic, camphoric, citric, tricarballylic and aconitic acids, etc.

Hydrocarboxylic acids may also be used in the practice of this invention. Illustrative examples of these are 6-hydroxycaproic, 10-hydroxydecanoic, 12-hydroxystearic, β-hydroxyacrylic, glyceric acid, 9,10-dihydroxy-stearic acid, 3,12-dihydroxypalmitic acid, trihydroxy n-butyric acids, trihydroxy isobutyric acid and aleuritic acid, etc.

The above polyhydroxy compounds, polycarboxy compounds and hydroxy carboxylic acids or mixtures thereof may be reacted with polyisocyanates to produce the foams of the instant invention. Moreover, these compounds or suitable mixtures thereof may be employed in the formation of the above mentioned polyesters which also may be reacted with polyisocyanates to produce these foams. In addition, compounds other than polyesters, which contain reactive hydrogen atoms and are capable of forming foams with polyisocyanates may be reacted with the latter to yield the products of the instant invention. Illustrative examples of such compounds are polyamides containing unreacted amide groups or polyethers such as polyethylene oxide containing unreacted hydroxyl groups.

Any polyisocyanate may be employed in the practice of the instant invention. Illustrative examples of these are trimethylene diisocyanate, tetramethylene diisocyanate, pentamethylene diisocyanate, hexamethylene diisocyanate, decamethylene diisocyanate, cyclo-pentylene-1,3-diisocyanate, 1,4-diisocyanato cyclohexane, p-phenylene diisocyanate, m-phenylene diisocyanate, the tolylene diisocyanates, the naphthalene diisocyanates, 4,4'-diphenyl propane diisocyanate, 4,4'-diphenylmethane diisocyanate, benzene-1,3,5-triisocyanate, toluene - 2,4,6 - triisocyanate, ethylbenzene - 2,4,6 - triisocyanate, monochlorobenzene-2,4,6-triisocyanate, triphenylmethane-4,4',4''-triisocyanate and diphenyl-2,4,4'-triisocyanate, etc.

Where the term "polyisocyanate" is used in the claims, it signifies a polyisocyanate or a compound which acts as a polyisocyanate at a relatively high temperature.

What we claim is:

1. In a process for the preparation of a foamed plastic by the reaction between an organic polyisocyanate and a polyhydroxy compound selected from the group consisting of (a) a polyester prepared by the esterification of a polycarboxylic acid with a polyhydric alcohol, (b) an aliphatic polyhydric alcohol, (c) an aromatic polyhydric alcohol, (d) an aliphatic polycarboxylic acid, (e) an aromatic polycarboxylic acid, and (f) a hydroxy carboxylic acid, the improvement comprising adding as an accelerator 3–10% by weight, based on the weight of said polyhydroxy compound, of a non-basic tertiary amine salt of a monomeric dicarboxylic acid.

2. Process of claim 1 wherein said reaction is effected in the absence of water, foaming being effected by the reaction between the polyisocyanate and the tertiary amine salt to liberate $CO_2$ and the tertiary amine, the latter serving to catalyze the reaction of the polyisocyanate with the polyhydroxy compound.

3. In a process for the preparation of foamed plastics which comprises reacting tolylene diisocyanate with a polyester prepared by the esterification of adipic acid and phthalic acid with hexanetriol, the improvement comprising adding to the reactants as an accelerator 3–10% by weight, based on the weight of the polyester, of the salt obtained from one mole of adipic acid and one mole of hexahydrodimethylaniline.

4. A process for making foamed plastics which comprises reacting an organic polyisocyanate-phenol addition compound with a linear polyester prepared by the esterification of adipic acid with ethylene glycol and diethylene glycol and lengthened by reaction with tolylene diisocyanate, and adding to the reaction as an accelerator 3–10% by weight, based on the weight of the polyester, of a salt obtained by reacting three moles of oxalic acid with two moles of the ester amine of diethanolamine and adipic acid, said initial reaction being conducted at a temperature sufficient to liberate said polyisocyanate from said addition compound.

5. A process for making foamed plastics which comprises reacting tolylene diisocyanate with a polyester prepared by the esterification of adipic acid with trimethylol propane and 1,3-butylene glycol, said process being accelerated by adding to the reactants 3–10% by weight, based on the weight of the polyester, of an adipic acid salt of the ester amine of dimethylethanolamine and adipic acid.

References Cited in the file of this patent

UNITED STATES PATENTS

| | | |
|---|---|---|
| 2,333,917 | Christ et al. | Nov. 9, 1943 |
| 2,650,212 | Windemuth | Aug. 25, 1953 |
| 2,692,874 | Langerak | Oct. 26, 1954 |
| 2,764,565 | Hoppe et al. | Sept. 25, 1956 |

FOREIGN PATENTS

| | | |
|---|---|---|
| 860,109 | Germany | Dec. 18, 1952 |